Figure 1:
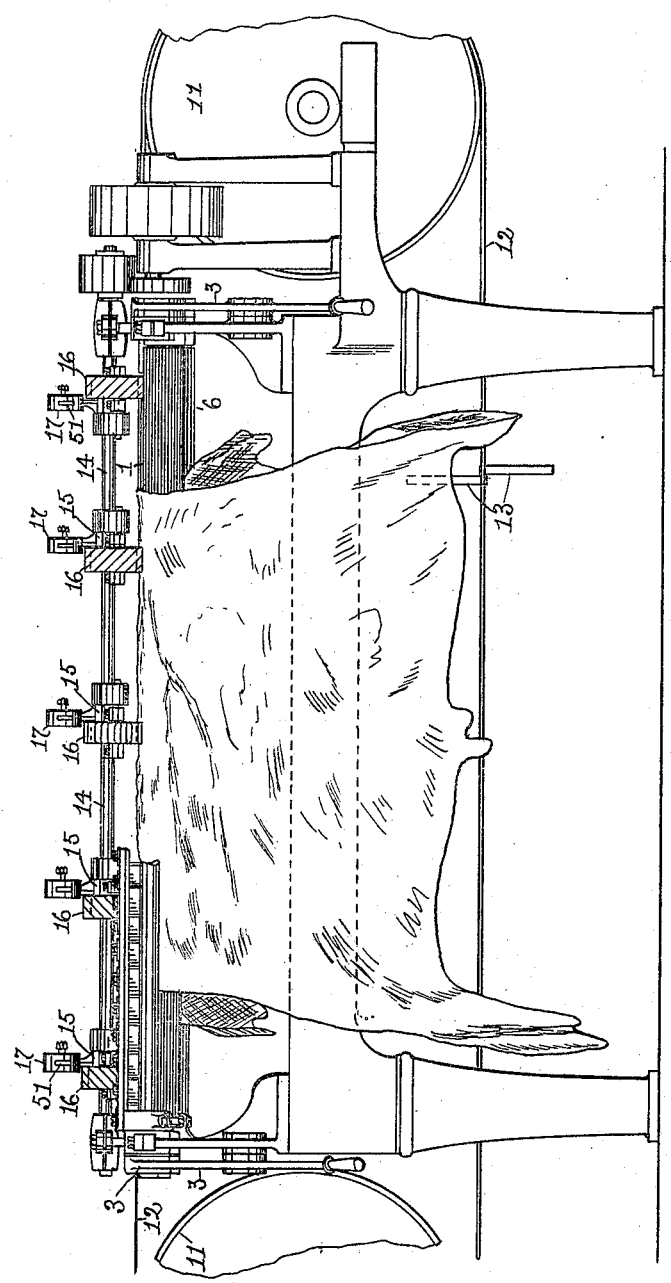

A. H. KEHRHAHN.
SPLITTING MACHINE FOR STRIPPING OFF FLESH FROM HIDES.
APPLICATION FILED AUG. 11, 1908.
944,488.
Patented Dec. 28, 1909.
4 SHEETS—SHEET 2.
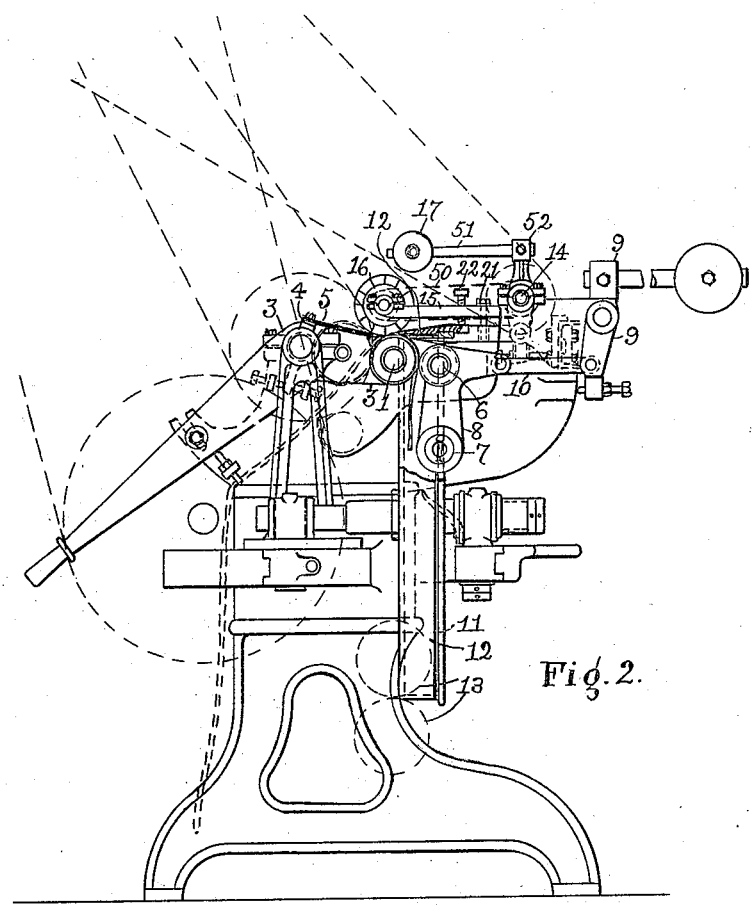
Fig. 2.
Fig. 3.
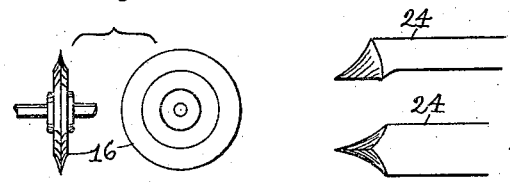
Fig. 4.
Witnesses.
C. H. Gannett
J. Murphy
Inventor,
Alexander Heinrich Kehrhahn
By Jas. H. Churchill
Atty.

A. H. KEHRHAHN.
SPLITTING MACHINE FOR STRIPPING OFF FLESH FROM HIDES.
APPLICATION FILED AUG. 11, 1908.

944,488.

Patented Dec. 28, 1909.

4 SHEETS—SHEET 3.

Witnesses.
Inventor.
Alexander Heinrich Kehrhahn
by Jas. H. Churchill
atty.

A. H. KEHRHAHN.
SPLITTING MACHINE FOR STRIPPING OFF FLESH FROM HIDES.
APPLICATION FILED AUG. 11, 1908.

944,488.

Patented Dec. 28, 1909
4 SHEETS—SHEET 4.

Witnesses.

Inventor.
Alexander Heinrich Kehrhahn
Jas. H. Churchill
Atty.

UNITED STATES PATENT OFFICE.

ALEXANDER HEINRICH KEHRHAHN, OF FRANKFORT-ON-THE-MAIN, GERMANY.

SPLITTING-MACHINE FOR STRIPPING OFF FLESH FROM HIDES.

944,488.

Specification of Letters Patent.   Patented Dec. 28, 1909.

Application filed August 11, 1908. Serial No. 448,049.

*To all whom it may concern:*

Be it known that I, ALEXANDER H. KEHRHAHN, engineer, a citizen of the German Empire, residing at Otto street 13, Frankfort-on-the-Main, in the Province of Rhineland, Prussia, Germany, have invented new and useful Improvements in Splitting-Machines for Stripping Off the Flesh from Hides, in which the distance of the knife's edge from the hide is regulated by a groping-tool, of which the following is a specification.

For stripping off the flesh from hides there exist already splitting-machines with cleaver in which the working sphere of the cleaver is regulated by a tool bearing against the hide and ascertaining its irregularities by groping. In this way however, a convenient regulation of the working depth of the cleaver cannot be attained, as the groping tool, passing over the layer of shreds of the hide, does not properly ascertain the differences in the thickness of the actual layer of leather of the hide and rather registers the differences in the total strength of the hide, that is of the hide itself and in addition the layer of shreds or parings. The results obtained in this manner would do, if only the hide itself varied in strength and if the layer of shreds were even. This, however, is not the case and more particularly, local callosities frequently occur in the layer of shreds by lumps of fat and flesh sticking to it. Consequently the method of regulating the sphere of action of the cleaver in conformity with the total strength cannot produce correct results.

The present invention has for its object to obtain a reliably exact regulation, by employing groping tools, which can force their way through the layer of shreds down to the surface of the actual hide and bear against said surface without entering the hide itself and thereby cause the hide to be presented to the knife or cleaver, either by moving the knife with relation to the hide or vice versa, so that the layers of shreds are cut on the division line between the firm and soft layers, whereby the complete removal of the layer of shreds without injuring in the least the valuable firm portion of the hide, is effected.

My invention also gives the possibility of working the hide all over its width in one operation by arranging several groping tools, independently of one another and by combining each groping device with a narrow guide for the knife. Then the contouring line of the actual cross section, formed by the edge of the knife, is properly fitting the actual layer of the leather, while at the same time each single guide of the knife is adjusted to adapt itself exactly to the irregularities in the longitudinal direction of the hide.

The invention may be executed in two different manners. Either, as mentioned in the foregoing description, a blade or cleaver, movable by itself, is led by the groping tools against the evenly supported hide, or the hide is led by means of a supporting cylinder, consisting of several links, against a straight guided blade, the aforesaid links being affected by the mentioned groping-tools. In this case any ordinary blade would do and no special knife is required. Also the groping tools may be constructed in different manners provided they meet with the requirement, that they can force their way through the layer of shreds or the parings down to the leather itself, such as wheels with jagged projections all over to penetrate through the parings, as will be hereinafter described. Such groping tools in themselves do not require to be driven. These tools may, however, also consist of properly actuated small cylinders with helicoidal scraping blades, thus as it were of segments of the well known scraping roller, as will be described. The selection of the tool is greatly dependent on the nature of the leather to be treated. The last mentioned scraping rollers will be preferably employed if the hide has an extremely strong layer of shreds. These and other features of this invention will be pointed out in the claims at the end of this specification.

Figure 5:
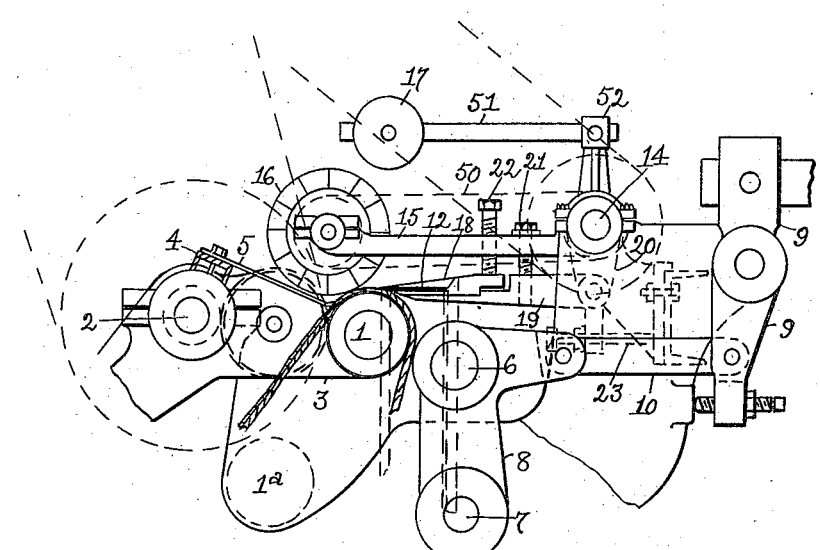
Figure 6:
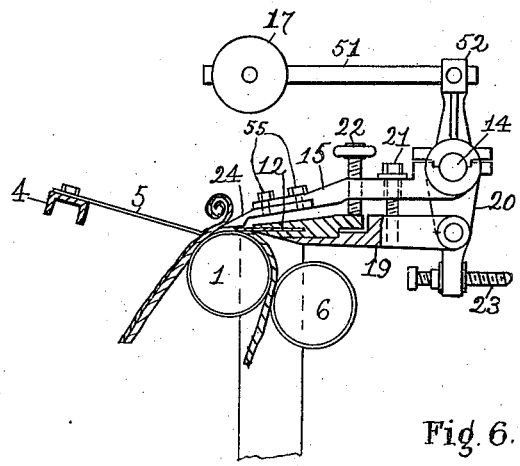
Figure 7:
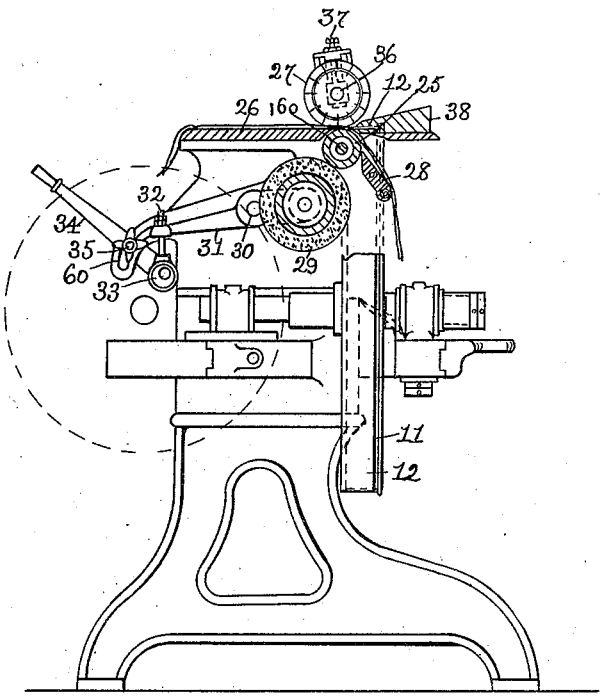

Figure 1 is a front elevation of a splitting machine embodying this invention. Fig. 2, an end elevation of the machine shown in Fig. 1 looking toward the left. Figs. 3 and 4, details to be referred to. Fig. 5, a detail on an enlarged scale of the machine shown in Fig. 1. Figs. 6 and 7, modifications to be referred to, and Fig. 8, a detail in elevation of the machine shown in Fig. 7.

In Figs. 1 to 6, I have shown the invention as embodied in a splitting machine in which the knife is movable bodily by the groping tools with relation to the hide or skin.

Referring to Figs. 1, 2 and 5, 1 represents a supporting cylinder or bed roll for the hide, which bed roll in the well-known manner is carried by a swing frame 3 mounted on the shaft 2 so as to permit the bed roll to be lowered from its operative position indicated by full lines into its inoperative position indicated by dotted lines 1ª. A so called finger board is arranged, and consisting in this case of a rail 4 with steel segments 5, each of which exerts by itself a pressure against the hide, and serves the purpose of maintaining the hide even as it passes over the bed roll 1. The bed roll 1 has coöperating with it a feed roll 6 mounted in a swing frame 8 pivoted at 7 and connected by the link 10 with a weighted lever 9, which permits the feed roll to yield to accommodate different thicknesses of the hide. Behind the bed roll 1, is located the belt knife or cleaver 12, which passes over and is caused to travel by the wheels or disks 11, the edge of the knife being directed toward the top of the bed roll 1, and is kept sharp by the usual grinding disks 13 (see Figs. 1 and 2). A row of arms 15 mounted to turn freely on a common shaft 14, are extended over the upper part of the knife or cleaver and carry groping tools, which are shown in Figs. 1, 2 and 5, and wheels or rollers 16 having peripheral projections, which are adapted to penetrate into the soft part of the hide. The wheels 16 may be driven from the shaft 14 by belts 50 indicated by dotted lines in Fig. 5. Each groping wheel 16 is pressed down on the hide by a weight 17 on a rod 51 attached to an arm 52 secured to or forming part of the arm 15. The up and down motion of the groping rollers are in the following manner made available for regulating the knife or cleaver. Close behind each groping roller 16, the knife or cleaver 12 is clasped from each side by a narrow slotted guide 18, as more particularly shown in Fig. 5. The arm 19 carrying the guides 18 are adapted to turn by themselves on the downwardly directed arms 20, which are connected to the supporting arms 15; they being, however, fixed in a given position in relation to the groping rollers by means of a pull screw 21 and a forcing screw 22. Thus, during the operation, each supporting arm 15 with its groping tool 16 and arm 19, belonging to it and the knife-guide 18 form a rigid system, the downward oscillation of which is limited by the set screw 23 carried by the arm 20, for preventing the groping roller from striking on the supporting cylinder when this latter is not protected.

The hide is fed through the machine by the bed roll 1 and a conveyer or feed roll 6, which are driven in any suitable manner, and each groping roller, independently of the others and further independently of the thickness of the hide or skin and of the layer of shreds, forces its way through the latter without injuring in the least the hide or skin itself. By this forcing through of small groping rollers, however, the position of the knife-edge at the same point is regulated in such a way, that the knife takes away the layer of shreds or the parings and nothing more than this layer. The exact position of the edge of the knife with relation to the groping roller is regulated by the aforesaid set screws 21 and 22. The individual groping tools and knife-guides are adapted to slide on the shaft 14 for allowing their position to be adjusted according to the material.

In Figs. 4 and 6, the groping tool is shown as a pointed knife or blade 24, which is adapted to penetrate the parings and is rigidly secured to the arm 15 as by the screws 55.

In the machine above described, the knife 12 is movable with relation to the hide on the bed roll or supporting cylinder 1, but it is not desired to limit the invention in this respect, as it may be embodied in a splitting machine employing a knife, which is stationary or is practically stationary with relation to the hide, which in this case is moved by the groping tools with relation to said knife.

Figure 8:
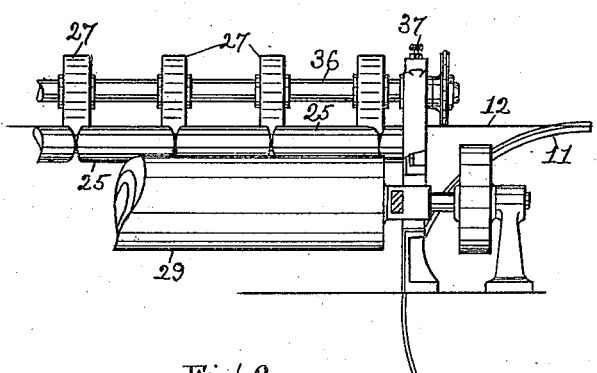

In Figs. 7 and 8, are shown a sufficient portion of a belt knife splitting machine of usual or well-known construction provided with groping tools which penetrate the soft layer of the hide and effect movement of the latter with relation to the knife, so as to present the hide thereto in such manner as will insure the removal of the soft layer without injuring the firm and valuable portion of the hide. In the machine represented in Figs. 7 and 8, the hide is supported by a ring roll 25 of well-known construction and comprising a series of loose juxtaposed rings strung upon a central rod 160 and bodily movable individually by reason of their large bore holes. The ring roll 25 is supported between the table 26 and back plate 28 by the bed roll 29 provided with a thick covering of soft rubber, which permits the individual rings of the ring roll 25 to be depressed by the hide or skin when the latter passes between the ring roll and the groping tools or disks 27, which are mounted on a shaft 36 supported at its ends in boxes, which are adjustable by means of the set screws 37 so as to position the groping disks with relation to the knife 12. The bed roll 29 is shown as mounted in a swing frame 31 pivoted at 30 and connected by rods 32 with eccentrics 33 adapted to be turned by the lever 34 to which the swing frame 31 is adjustably connected by the screw 35 extended through the curved slot 60 in said frame. The arrangement just described permits the bed roll 29 to be initially adjusted with relation to the ring roll 25 and the knife 12. The disks or wheels 27 having the peripheral projections are rotated at the same surface speed as the ring roll and as the hide or skin passes between them, the points or projections on the disks 27 press themselves into the softer layer of shreds, until they meet or substantially meet the firm layer of the hide whereupon the said projections force the individual rings of the ring roll down into the soft covering of the bed roll more or less according to the depth or thickness of the softer layer of the hide, thereby moving the latter with relation to the knife so as to present the hide to the knife to cause the softer layer to be cut or removed by the knife after the manner above described with relation to the machine shown in Figs. 1 to 5.

I claim:

1. In splitting machines for stripping off the flesh from hides in combination a supporting cylinder 1, a shaft 2, a rail 4 with steel segments 5, a conveyer roll 6 mounted in a swing frame 8 and weighted bent lever 9 with moving forward rod 10, a cleaver 12 made to pass over the disk 11 and edging contrivance 13, a series of arms 15 adapted freely to turn over a common shaft 14, on the said arms mounted scraping rollers as groping tools and means for making each scraping roller 16 bear against the hide and force its way through the parings, independently of the other scraping rollers, a number of slotted guides 18 close behind each scraping cylinder, arms 19 containing these guides and adapted to turn on the downwardly directed arms 20, screws 21 and 22 and means for forming during the operation a rigid system between the supporting arm 15 with scraping cylinder 16 and the arm 19 with guides 18, and set screw 23, the individual groping tools and blade guides adapted to be displaced on the shaft 14, all substantially as set forth.

2. In splitting machines for stripping off the flesh from the hides in combination a number of groping tools independent of one another, a narrow cleaver guide for each groping device adapted to operate on the hide all over its width and means for making each of the single blade guides to fit exactly the irregularities in the longitudinal direction of the hide, all substantially as and for the purpose set forth.

3. In a machine of the class described, in combination, a supporting roll for the hide or skin and a knife coöperating therewith, one of which parts is movable with relation to the other, and a groping device to penetrate the softer surface of the hide or skin and effect movement of said movable part so as to cause the softer portion to be acted upon by the knife in the immediate vicinity of the firm portion of the hide or skin, substantially as described.

4. In a machine of the class described, in combination, a support for the hide or skin, and a knife coöperating therewith, one of which parts is movable with relation to the other, and means for penetrating the fleshy side of the hide or skin and coöperating with the said movable part to cause the knife to cut the flesh side in the immediate vicinity of the firmer portion of the hide or skin, substantially as described.

5. In a machine of the class described, in combination, a bed roll, an endless belt knife coöperating therewith and movable longitudinally thereof, guides for said knife, groping tools capable of penetrating the flesh side of the hide or skin, and means for connecting said tools with said guides to cause the knife to be automatically raised and lowered with relation to the bed roll and the hide or skin thereon by variation in the depth to which the groping tools penetrate the softer portion of the flesh side of the hide or skin, substantially as described.

6. In a machine of the class described, in combination, a bed roll, an endless belt knife coöperating therewith and movable longitudinally thereof, one of which parts is movable with relation to the other in a direction substantially at right angles to the length of said other part, and means capable of penetrating the softer flesh side of the hide or skin and coöperating with said movable part to cause the knife to cut the softer layer of the flesh side in the immediate vicinity of the firmer layer of said flesh side, substantially as described.

In testimony whereof I have signed my name to this specification in the presence of two subscribing witnesses.

ALEXANDER HEINRICH KEHRHAHN.

Witnesses:
 JEAN GRUND,
 CARL GRUND.